United States Patent

Batawi et al.

[11] Patent Number: 5,932,368
[45] Date of Patent: Aug. 3, 1999

[54] HIGH TEMPERATURE FUEL CELL WITH A THIN FILM ELECTROLYTE

[75] Inventors: Emad Batawi, Winterthur; Kaspar Honegger, Wallenwil, both of Switzerland

[73] Assignee: Sulzer Innotec AG, Winterthur, Switzerland

[21] Appl. No.: 08/782,202

[22] Filed: Jan. 10, 1997

[30] Foreign Application Priority Data

Feb. 2, 1996 [EP] European Pat. Off. .............. 96810071

[51] Int. Cl.$^6$ ..................................................... H01M 4/86
[52] U.S. Cl. ................................................. 429/30; 429/45
[58] Field of Search ........................................ 429/30, 45

[56] References Cited

U.S. PATENT DOCUMENTS

| | | | |
|---|---|---|---|
| 5,151,334 | 9/1992 | Fushimi et al. ........................ | 429/45 X |
| 5,261,944 | 11/1993 | Lockart et al. ........................ | 429/30 X |
| 5,308,712 | 5/1994 | Seike et al. ............................... | 429/30 |
| 5,368,941 | 11/1994 | Shiratori et al. ........................ | 429/45 X |

FOREIGN PATENT DOCUMENTS

| | | |
|---|---|---|
| 4205210 A1 | 8/1992 | Germany . |
| WO 95/07554 | 3/1995 | WIPO . |

OTHER PUBLICATIONS

Patent Abstracts of Japan, vol. 017, No. 375 (E–1397), Jul. 14, 1993 & JP–A–05 062691 (Murata Mfg. Co. Ltd.), Mar. 12, 1993, Abstract.

Patent Abstracts of Japan, vol. 013, No. 099 (E–724), Mar. 8, 1989 & JP–A–63 274062 (Fujkura Ltd.), Nov. 11, 1988, Abstract.

Dokiya, M., et al. "Fabrication of a Planar Solid Oxide Fuel Cell", *Proceedings of the Intersociety Energy Conversion Engineering Conference (IECEC);*, Washington, Aug. 6, 1989, vol. 3, pp. 1547–1551.

Kawada, Tatsuya, et al., "Fabrication of a Planar Solid Fuel Cell by Tape–Casting and Co–Firing Method", *Journal of the Ceramic Society of Japan,* International Ed., vol. 100, No. 6, Jun. 1, 1992, pp. 838–841.

*Primary Examiner*—Stephen Kalafut
*Attorney, Agent, or Firm*—Townsend and Townsend and Crew LLP

[57] ABSTRACT

The high temperature fuel cell with a thin film electrolyte has an electrochemically active element which is executed as a planar multi-layer structure. At least the electrolyte and cathode layers are deposited on a porous, gas-permeable carrier structure, by means of a thin film technique. The carrier structure is a sintered body of metal ceramic material which comprises a highly porous base layer as well as a fine pored cover layer of anode material placed on the base layer. The pores of the base layer are open with respect to one another and have an average diameter of the order of magnitude of at least about 300 $\mu$m. The pores of the cover layer have diameters which are not substantially greater than 1 to 3 $\mu$m. The coefficient of thermal expansion of the carrier structure is substantially the same as that of the solid electrolyte.

15 Claims, 1 Drawing Sheet

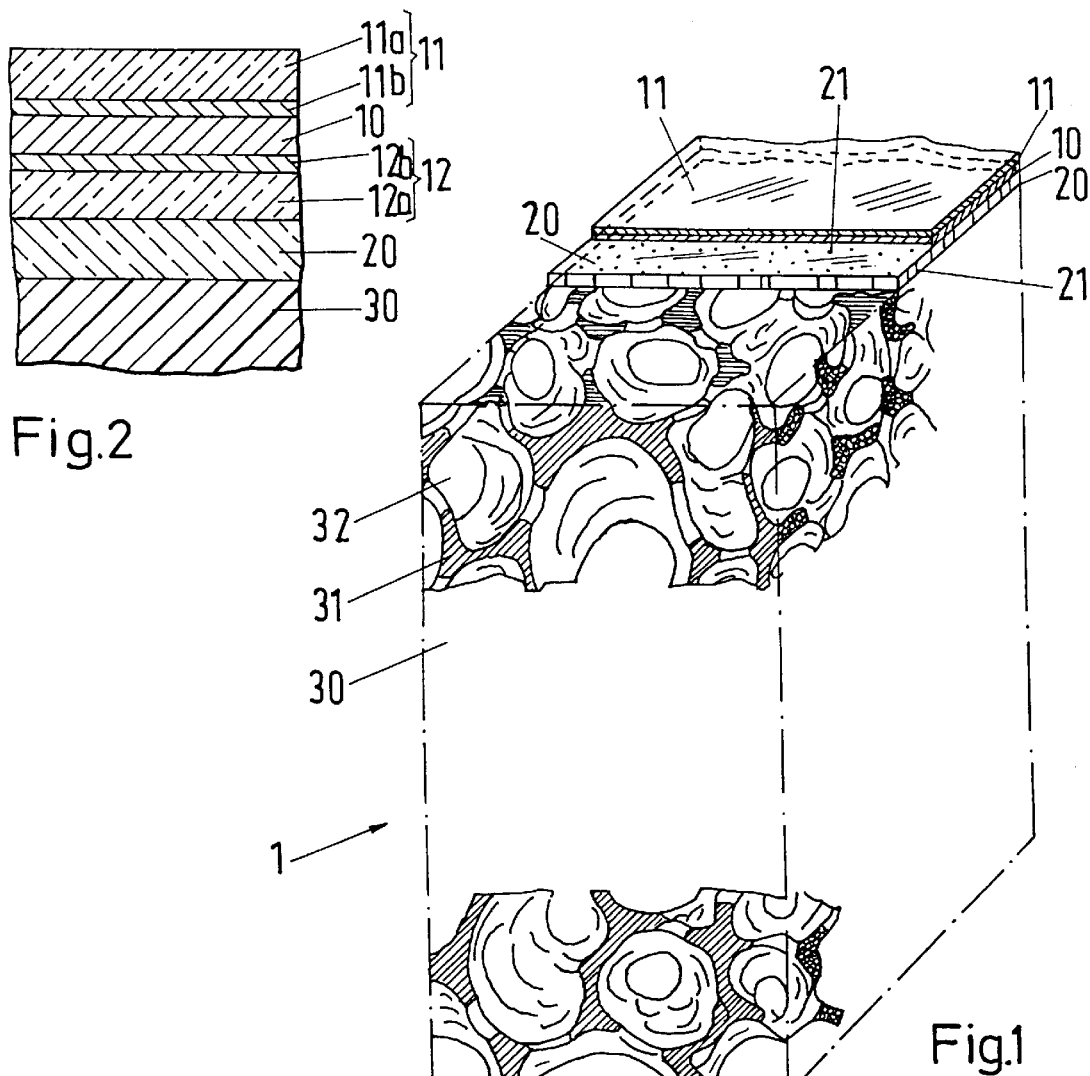
Fig.2
Fig.1
Fig.3
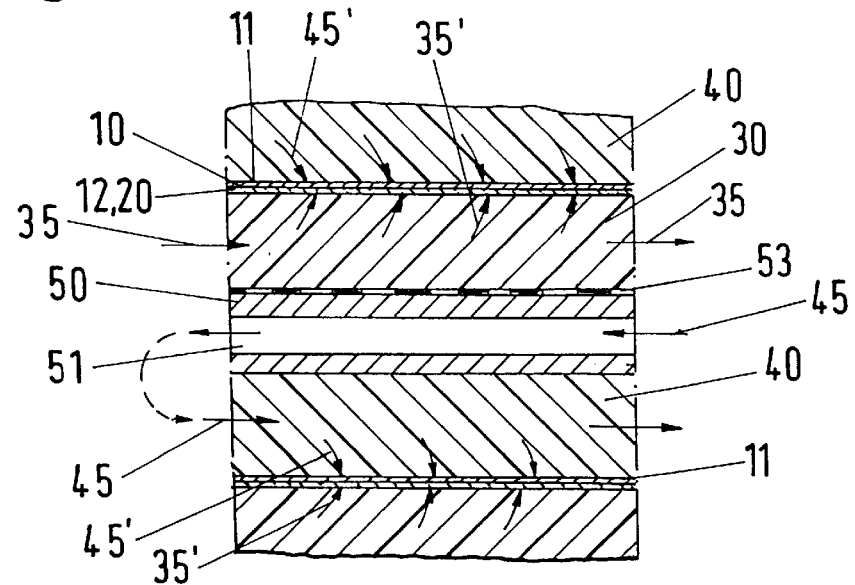

HIGH TEMPERATURE FUEL CELL WITH A THIN FILM ELECTROLYTE

BACKGROUND OF THE INVENTION

1. Field of the Invention

The invention relates to a high temperature fuel cell with a thin film electrolyte in accordance with the preamble of claim 1. Such a fuel cell is known from Publication EP-A 0 722 193. The invention also refers to a battery with fuel cells arranged in stacks.

2. Description of the Prior Art

In the known fuel cells, the electrochemically active element, which consists of an anode, a solid electrolyte and a cathode in a planar arrangement, is manufactured by means of a vacuum-plasma injection process, a VPS process for short.

Thin film electrolytes, such as can be manufactured by the VPS process, permit operating temperatures of 600 to 800° C. In electrochemically active elements in the form of self supporting plates, as are customary in the older types of fuel cells, the operating temperatures lie between 900 and 1000° C. Various problems in connection with the choice of material which give rise to high costs at the higher temperatures do not arise at the lower temperatures. Nameworthy cost reductions in comparison with the older types of fuel cells are therefore to be expected in the case of fuel cells with thin film electrolytes. The long term stability of the fuel cells is also improved.

In the known fuel cell, the carrier structure for the electrochemically active element is a flexible porous body built up of layers. In a boundary zone of this carrier structure, the pores, which are relatively large, are filled with fine metallic particles. This boundary zone represents a fine pored layer onto which the thin film layers of the electrochemically active element can be applied. The flexibility of the carrier structure has the advantageous effect that damaging thermal strains between the ceramic electrolyte and the metallic carrier structure can be avoided. The proposed use of a metallic felt for the carrier structure is however problematic with respect to the manufacture of the electrochemically active element by means of a thin film technique, since it is difficult to manufacture a substrate suitable for application of the thin film layers by means of the disclosed process. A substrate is suitable if it has a smooth, homogeneous surface free of defects in spite of its porosity.

SUMMARY OF THE INVENTION

It is thus the object of the invention to provide a fuel cell whose carrier structure for the electrochemically active element is more suitable as a substitute for coating with a thin film.

A high temperature fuel cell with a thin film electrolyte in accordance with the present invention has an electrochemically active element which is built up as a planar multi-layer structure. At least the electrolyte layer and the cathode layer are applied on a porous carrier structure permeable to gas by means of a thin film technique. The carrier structure is a sintered body of a metallic ceramic material ("cermet") which comprises a highly porous base layer as well as a fine pored cover layer of anode material placed on the base layer. The pores of the base layer are open with respect to one another and have an average diameter on the order of magnitude of at least about 300 $\mu$m. The pores of the cover layer have diameters which are not substantially larger than 1 $\mu$m. The coefficient of thermal expansion of the carrier structure is substantially equal to that of the solid electrolyte.

BRIEF DESCRIPTION OF THE DRAWINGS

FIG. 1 illustrates an electrochemically active element on a carrier structure in accordance with the invention having a base layer in the form of an open-pore foam structure, FIG. 2 is a schematic view of a multi-layer construction of an electrochemically active element, and FIG. 3 is a part of a cross-section through the fuel cells of a cell stack with the cross-sectional plane lying parallel to the stack axis.

DETAILED DESCRIPTION OF THE PREFERRED EXEMPLARY EMBODIMENTS

A planar multi-layer structure 1 of FIG. 1 is composed of the following sheets or layers: an electrolyte 10 which is produced using a thin film technique; a cathode 11 on the air side of the electrolyte 10; a cover layer 20 which together with the base layer 30 forms a carrier structure for the layers 10 and 11 on the one hand, and which, on the other hand, simultaneously functions here as the anode. The cover layer 20 is porous (pores 21 in FIG. 1).

The base layer 30 consists of metallic ceramic material 31 and has large pores 32. The foam structure illustrated is obtained for example as follows: The skeleton of an open-pored plastic foam is coated with a slurry containing powder particles of metallic oxides and ceramic material. After drying, a suitable stable carrier structure is obtained by sintering in a reducing atmosphere in which the metallic oxides give off their oxygen. During sintering, the material of the plastic skeleton vaporizes.

The cover layer 20 is preferably produced by means of a band casting procedure,. In this procedure a plastically deformable mixture of powdered solid substances and binder means is rolled out into thin sheets with a thickness of about 0.3 mm. It is preferable to use the same or similar materials for the solid substances as are used for the base layer, which convert into a form suitable for the anode reaction on sintering in a reducing atmosphere. The freshly prepared film is laid on the undried base layer. The two layers combine on drying. A volume reduction results on sintering of this two-layer body. The thickness of the cover layer 20 reduces to about 150 $\mu$m. Pores 21, which are not substantially larger than 1 $\mu$m, simultaneously form due to the reduction of the metallic oxides. Depending on the manufacturing process, the thickness of the cover layer 20 has a value between 80 and 300 $\mu$m.

An advantageous mixture of the powdered solid substances for the manufacture of the base layer and the cover layer consists of 70% NiO and 30% YSZ (=$ZrO_2$ stabilised with $Y_2O_3$=electrolyte material). PVB (polyvinyl butyral) and/or PEG (polyethylene glycol) is/are added to this mixture as a binder. A phosphate ester is used as a dispersion agent. Ethylene glycol is a suitable solvent. The sintering is done at about 1400° C. Afterwards the nickel oxide NiO is reduced in a hydrogen atmosphere to metallic nickel; the stabilized zirconium oxide YSZ remains chemically unchanged in the process.

Thanks to the filigree construction of the carrier structure, no strains arise during sintering which would lead to cracks, which is otherwise often observed in the manufacture of monolithic bodies from metal ceramic material.

FIG. 1 shows the simplest construction of an electrochemically active element deposited on a carrier structure. The thin film technique permits the relatively simple manufacture of complicated multi-layer structures which, thanks to this complexity, have advantages over the most simple construction. Such a structure with a multi-layer construction is indicated in FIG. 2: an anode 12 consisting of two films 12a and 12b is deposited on the cover layer 20, which here no longer has the function of an anode.

During the operation of the fuel cell, the anode reactions take place in the film 12a, which, for instance contains the above mentioned mixture of Ni and YSZ and which, is from 5 to 30 $\mu$m thick. Other metals or mixtures of metals can be used instead of Ni. Instead of the YSZ, which is an ionic conductor, ceramic materials which conduct electrons as well as ions can also be used (e.g. cerium oxide doped with gadolinium).

The second film 12b is a compensatingly acting transition layer with a thickness of 1 to 15 $\mu$m. As a result of the specially chosen composition and construction, the transition layer 12b bridges differences between the materials of the following layer 10, namely of the electrolyte layer, and of the outer anode layer 12a. The film 12b consists, for example, of a mixture of substances which conduct electrons and ions.

The cathode 11, which like the anode is built up of two films 11a and 11b, lies on the electrolyte layer 10, which is 5 to 20 $\mu$m thick. The film 11b is likewise a transition layer which, conducts ions and electrons or which for example is catalytically active by means of palladium. The film 11a is the electrochemically active cathode which consists of a perovskite.

Various techniques can be used for manufacturing the various thin films: thermal spraying procedures such as VPS, which is also called LPPS ("Low Pressure Plasma Spraying"), or high speed flame spraying (HVOF="High Velocity Oxy Fuel"); also PVD ("Physical Vapour Deposition") or magnetron sputtering or EBPVD ("Electron Beam PVD"); furthermore, silk screen printing techniques or sol-gel procedures.

The base layer 30 can easily be soldered onto a metallic plate using, for example, a NiCrP soldering film. To manufacture a fuel cell the base layer 30 is soldered onto a plate-shaped body 50 (see FIG. 3) which is provided as a heat exchanger for heating the air required for the reaction.

FIG. 3 shows a part of a cross-section through two adjacent fuel cells of a cell stack. A part of an air conveying layer 40 can be seen at the upper end of this section. The arrows 45' indicate the transport of oxygen from the air 45 to the cathode 11. The gas 35 flowing into the base layer 30 on the other side of the electrolyte 10 supplies—arrows 35' the anode 12 with hydrogen and carbon monoxide, which are transformed to water and carbon dioxide via energy releasing anode reactions.

The base layer 30 is connected to the heat exchanger plate 50 via a soldered connection 53. This plate 50 with air channels 51 is the first layer of the adjacent fuel cell. After the air 45 has been heated to the reaction temperature by flowing through the channels 51, it is introduced into the air conveying layer 40 of the lower cell via a non-illustrated connection. This layer 40 can be formed in a manner similar to the layer 30 by a ceramic foam body, which must not contain any oxidizable metals. The layer 40 can also be manufactured by means of uniformly arranged knobs or burls which are firmly connected either to the lower side of the heat exchanger plate 50 or to the surface of the cathode 11.

It is also possible to provide the air conveying layer 40 as a carrier for the electrochemically active element 11, 10, 12 in place of the gas conveying layer 30. Such a solution is described in the European Patent Application No. 95810026.5 (=P.6658). It contains a highly porous, sintered body which is manufactured of a cathode-like material. The carrier structure disclosed here has the following advantages over this solution:

An improved mechanical stability which—especially at the high temperatures—has high resistance to irreversible deformations.

An improved conductivity, especially at the envisaged operating temperatures of 600–800° C.

An improvement in the executability of the solder connections due to the metallic constituents.

Greater ease of manufacturing element built up of a ceramic foam and a cover layer using anode-like instead of cathode-like material.

A simple production of the porosity in the cover layer necessary for the passage of the gas through the sintering in a reducing atmosphere.

Fewer problems in the manufacture of electrochemically active elements with large diameters.

Further embodiments of highly porous carrier structures are described in the said application No. 95810026.5 (see FIGS. 9 and 10 there). Corresponding carrier structures can also be provided for the gas-side base layer 30.

Specific fuel cells having a centrally symmetrical construction are also described in the same application FIGS. 1 and 2). Correspondingly constructed cells can be manufactured with the multi-layer structure disclosed here. Such cells connected in series form a cylindrical stack.

What is claimed is:

1. A high temperature fuel cell with a thin film electrolyte that includes an electrochemically active element consisting of a cathode layer, an electrolyte and an anode layer the electrolyte being executed as a planar multi-layer structure wherein at least the electrolyte layer and the cathode layer are attached to a porous, gas-permeable carrier structure by means of a thin film technique, wherein the carrier structure is a sintered body of metal-containing ceramic material which comprises a porous base layer and a pored cover layer placed on the base layer, wherein the pores of the base layer are open with respect to one another and have an average diameter of at least about 300 $\mu$m, while the pores of the cover layer have diameters which are smaller than about 1 $\mu$m, and wherein the coefficient of thermal expansion of the carrier structure is substantially the same as that of the electrolyte.

2. A high temperature fuel cell in accordance with claim 1 wherein the cover layer is manufactured by means of a band casting procedure and has a thickness of 80 to 300 $\mu$m.

3. A high temperature fuel cell in accordance with claim 1 wherein the base layer has an open-pore foam structure.

4. A high temperature fuel cell in accordance with claim 1 wherein the metal-containing ceramic material of the carrier structure consists of nickel and stabilized zirconium oxide.

5. A high temperature fuel cell in accordance with claim 1 wherein the thickness of the electrolyte layer amounts to between about 5 and 20 $\mu$m.

6. A high temperature fuel cell in accordance with claim 1 wherein the electrolyte layer is deposited directly onto the cover layer of the carrier structure.

7. A high temperature fuel cell in accordance with claim 1 wherein at least one layer acting as an anode is placed between the cover layer of the carrier structure and the electrolyte layer.

8. A high temperature fuel cell in accordance with claim 7 wherein the anode consists of two films, a 1 to 15 $\mu$m thick compensatingly acting transition layer and a 5 to 30 µm thick layer at which the anode reactions can take place, with these layers being composed of mixtures of one or more metals and ceramic materials.

9. A high temperature fuel cell in accordance with claim 1 wherein the cathode consists of two layers, a 1 to 15 µm thick compensatingly acting transition layer, and a 5 to 30 µm thick layer at which the cathode reactions can take place, with these layers being composed of mixtures of one or more metals and ceramic material.

10. A high temperature fuel cell in accordance with claim 1 wherein the base layer of the carrier structure is soldered into the one surface of a plate-shaped body, with said body being provided for the infeed of air into the cell.

11. A battery of high temperature fuel cells in accordance with claim 1 wherein the cells are formed substantially centrally symmetrically; and in that the cells connected in series form a cylindrical stack.

12. A high temperature fuel cell in accordance with claim 1 wherein the pored cover layer consists of anode material.

13. A high temperature fuel cell in accordance with claim 1 wherein the cover layer has a thickness of about 150 µm.

14. A high temperature fuel cell in accordance with claim 8 wherein the compensatingly acting transition layer and the 5 to 30 µm thick layer are composed of electrolyte material.

15. A high temperature fuel cell in accordance with claim 9 wherein the compensatingly acting transition layer and the 5 to 30 µm thick layer are composed of electrolyte material.

* * * * *